United States Patent [19]
Klauk et al.

[11] 3,920,228
[45] Nov. 18, 1975

[54] SCRAPING AND STIRRING DEVICE FOR A COOKING UTENSIL

[75] Inventors: Bernhard Klauk, Gelsenkirchen; Wolfgang Schwan, Gelsenkirchen-Buer; Günter Schreiber, Lunen, all of Germany

[73] Assignee: K. Kuppersbusch & Sohne, Gelsenkirchen, Germany

[22] Filed: Feb. 23, 1973

[21] Appl. No.: 335,179

[30] Foreign Application Priority Data
Mar. 1, 1972 Germany............................ 2209731
Aug. 4, 1972 Germany............................ 2238350

[52] U.S. Cl................................... 259/107; 99/348
[51] Int. Cl.................................................. B01f 7/20
[58] Field of Search .............. 259/8, 22, 23, 42, 43, 259/66, 67, 107, 108, 178 A; 99/348

[56] References Cited
UNITED STATES PATENTS

| | | | |
|---|---|---|---|
| 1,797,753 | 3/1931 | Blesi | 259/107 |
| 2,513,254 | 6/1950 | Savage et al. | 259/107 |
| 2,991,051 | 7/1961 | Jones | 259/107 |
| 3,635,447 | 1/1972 | Kauffman et al. | 259/107 |

FOREIGN PATENTS OR APPLICATIONS

| | | | |
|---|---|---|---|
| 1,369,180 | 6/1964 | France | 259/108 |
| 702,373 | 1/1954 | United Kingdom | 259/108 |

*Primary Examiner*—Harvey C. Hornsby
*Assistant Examiner*—Alan Cantor
*Attorney, Agent, or Firm*—Stevens, Davis, Miller & Mosher

[57] ABSTRACT

A scraping and stirring device for a cooking utensil comprises a driving member adapted to be centrally arranged in the bottom of the cooking utensil and carrying horizontal supporting arms at an upper part thereof, the supporting arms carrying carrying arms depending therefrom and carrying scraping and stirring vanes in engagement with the bottom of the utensil, each scraping and stirring vane working only a part of the bottom of the utensil.

5 Claims, 6 Drawing Figures

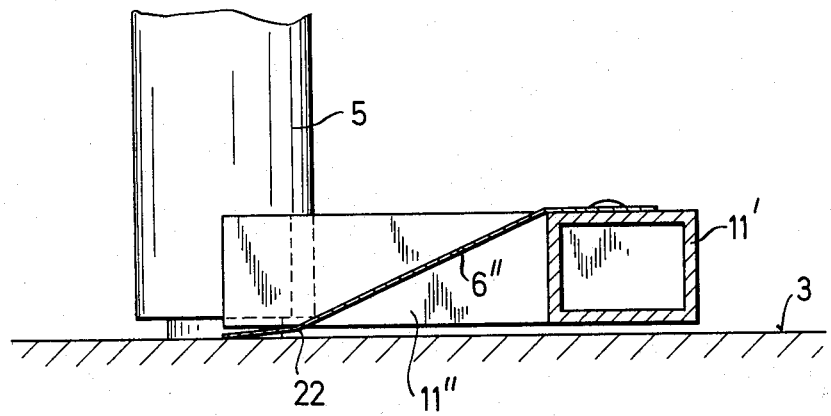
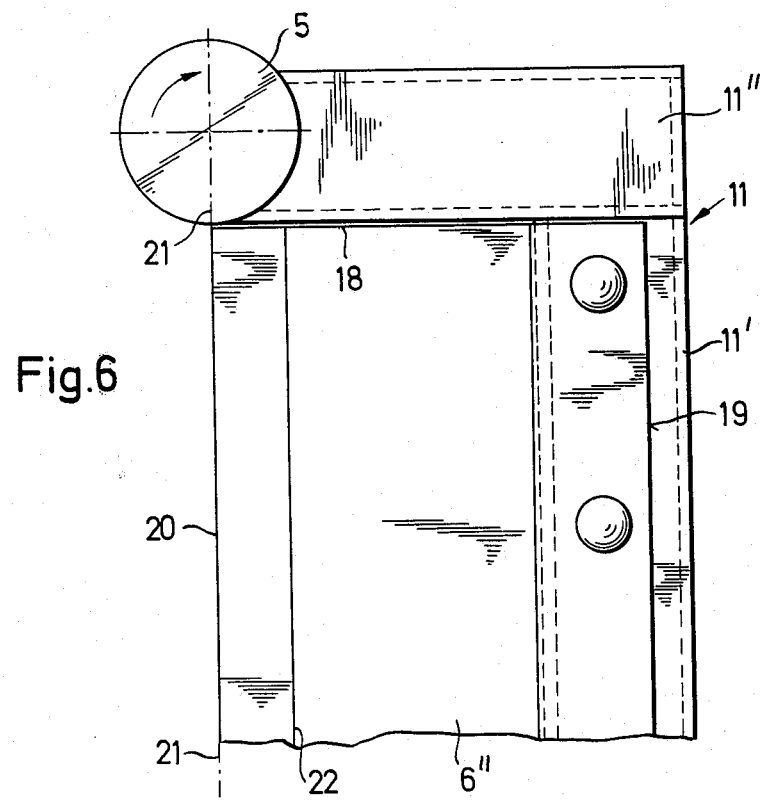

3,920,228

SCRAPING AND STIRRING DEVICE FOR A COOKING UTENSIL

BACKGROUND OF THE INVENTION

The invention relates to a scraping and stirring device for large cooking utensils. Such devices often have a drive member arranged centrally at the bottom of the cooking utensil, to which drive member are secured supporting arms, which run parallel to the bottom of the cooking utensil and have scraping and stirring vanes secured thereto.

In the case of a large cooking utensil of this type, the bottom surface of the cooker is continuously worked on by scraping on rotation by the scraping and stirring vanes grazing the heated bottom of the cooker in order to prevent, in this way, any setting solid as well as subsequent burning-on of the material being cooked. According to a proposal, the supporting arm secured to the rotating member with the scraping and stirring vanes is so dimensioned that the latter corresponds in dimensions approximately to the radius of the cooker bottom. The whole surface of the cooker bottom is swept by this during one rotation of this continuously formed scraping and stirring vane. Now it has been shown that such a construction, as well as arrangement of the supporting arm, and above all, however, of the scraping and stirring vane, is impracticable, because in so doing the supporting arm forms a large engagement area with the scraping and stirring vane so that, on traversing through the material being cooked, very large resistance forces have to be overcome by these parts. The consequence of this is premature wear phenomena which considerably increase the danger of breakdown during operation.

SUMMARY OF THE INVENTION

It is an object of the invention to improve the scraping and stirring function as well as the support construction of the above-mentioned device.

According to the invention there is provided a scraping and stirring device for a cooking utensil comprising a driving member adapted to be arranged centrally in the bottom of said cooking utensil, horizontal supporting arms carried by said driving member at an upper part thereof, carrying arms carried by and depending from said supporting arms and scraping and stirring vanes carried by said carrying arms in engagement with the bottom of said utensil and adapted in use to work only a part of the bottom of said cooking utensil.

BRIEF DESCRIPTION OF THE DRAWINGS

The invention will now be described in greater detail, by way of example, with reference to the drawings, in which:

FIG. 5 shows a driven scraping and stirring vane in side view and partially cut-away, and FIG. 6 shows a plan view of this arrangement according to FIG. 5.

DESCRIPTION OF THE PREFERRED EMBODIMENT

Basically the invention proposes that the supporting arms, running horizontally, are arranged on the head of the drive member and are each provided with a support arm directed towards the cooker bottom, and that there is arranged on each of the support arms, a scraping and stirring vane working on only one partial region of the cooker bottom.

By this it can be achieved that, on the one hand, the supporting arms come to lie outside the material being cooked and that, on the other hand, each scraping and stirring vane now has to work on one part-region of the cooker bottom. From this follow the substantial advantages that the entire scraping and stirring device is subjected to less resistance forces when rotating or passing through the material being cooked and in that in so doing, in addition to preventing any setting of the material being cooked, a substantially better stirring or mixing of the material being cooked is achieved.

In a further development of the invention, it is advantageous to connect the horizontally running supporting arms to a ring-shaped support frame. The stability of the entire scraping and stirring device is substantially increased by these meansures, since the support frame constructed in this way tends to prevent a greater resistance to the forces occurring on rotation from taking place.

According to the invention there is provided a scraping and stirring device for a cooking utensil comprising a driving member adapted to be arranged centrally in the bottom of said cooking utensil and extending into an upper region of said cooking utensil, horizontally extending supporting arms carried by said driving member at an upper part thereof and extending outwardly therefrom a distance which is at least half of the radial extent of the device, carrying arms carried by and depending from said supporting arms and connected to said supporting arms towards outer ends of said supporting arms and scraping and stirring vanes carried by said carrying arms and have one edge in engagement with the bottom of said utensil and adapted in use to work only a part of the bottom of said cooking utensil.

Figure 1:
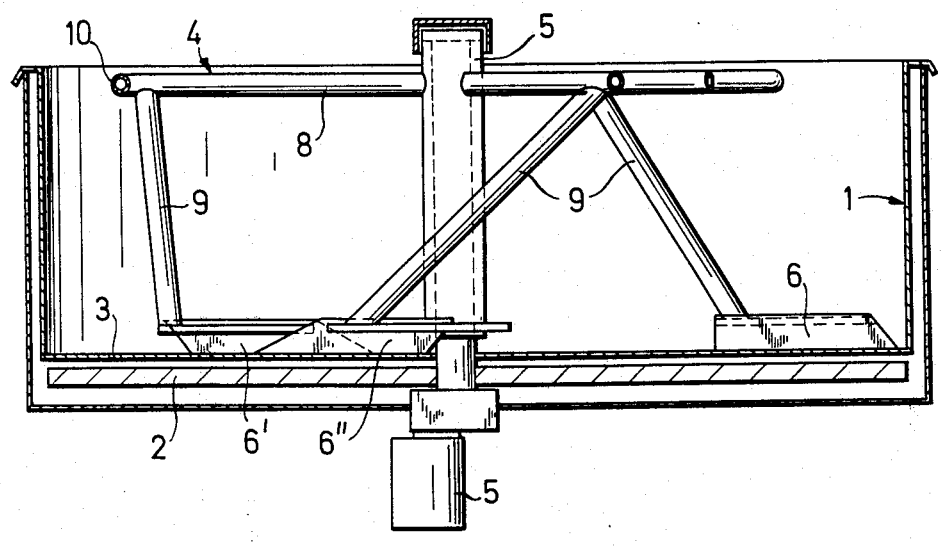
FIG. 1 shows a large cooking utensil with a scraping and stirring device according to the invention.
Figure 4:
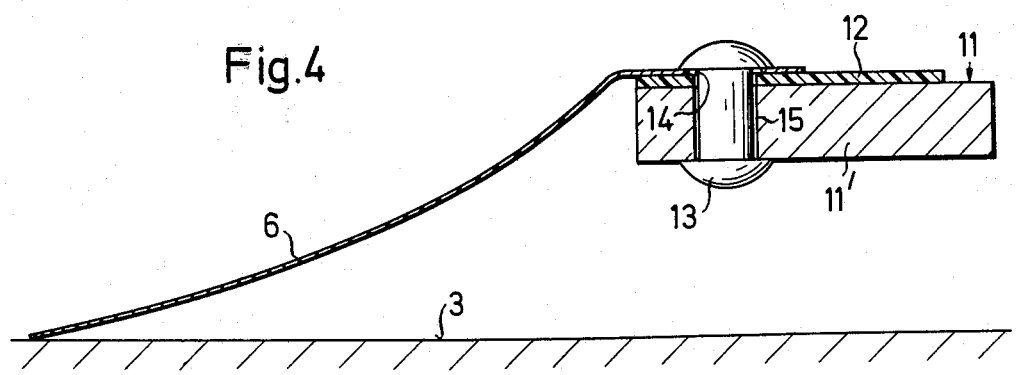
FIG. 4 shows the securing of a scraping and stirring vane of this device in a larger scale.
Figure 2:
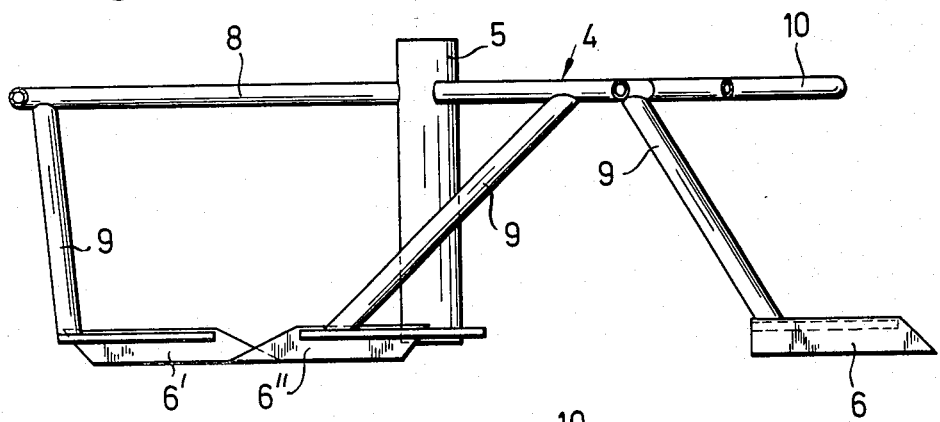
FIG. 2 shows the scraping and stirring device showing details and seen from the side.
Figure 3:
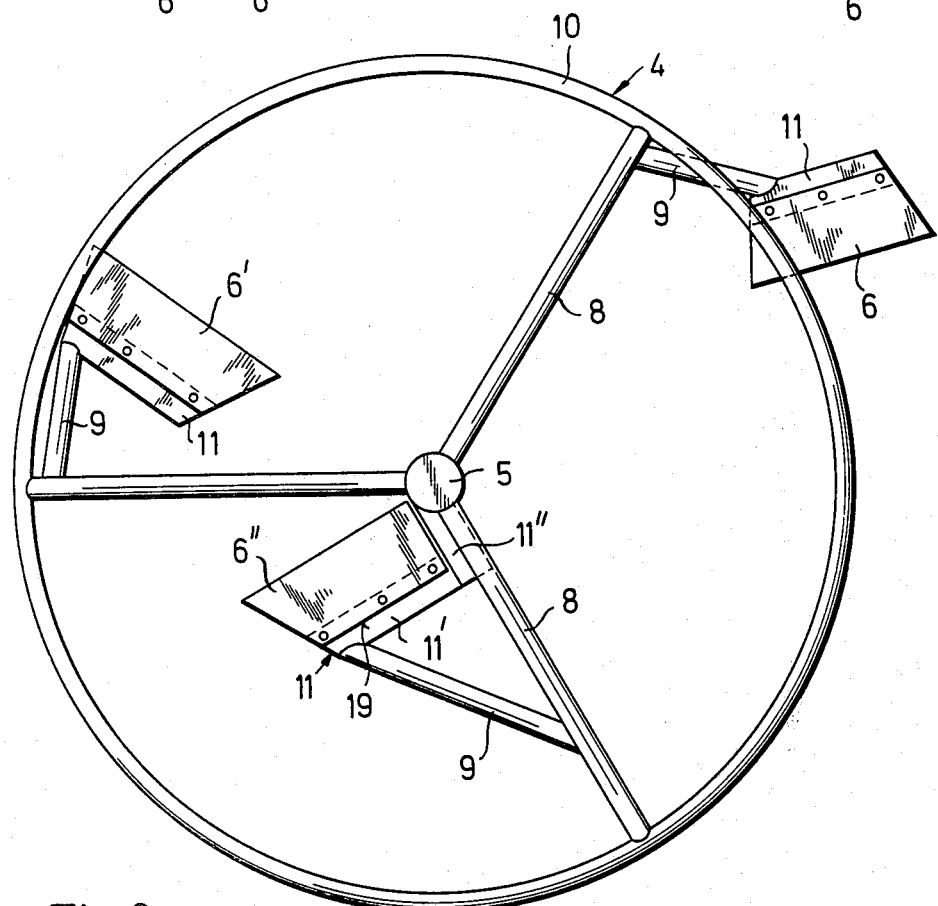
FIG. 3 shows the scraping and stirring device shown in FIG. 2 in plan view.

Referring now to the drawings. FIG. 1 shows a large cooking utensil which serves especially for preparing sauces, gravies, soups and similar cooked material. Arranged in the cooker 1, the bottom of which is associated with a heating device 2, there is a scraping and stirring device 4 working on the inner bottom surface 3 of the cooker 1 by scraping, which scraping and stirring device, on the one hand, prevents the material being cooked from setting solid, and on the other hand, simultaneously stirs the material being cooked. A drive member 5 for the scraping and stirring device 4, which drive member 5 is driven by a motor 5' arranged below the bottom surface 3 of the cooker bottom 1, is arranged at the centre of the cooker bottom.

The scraping and stirring device 4 has a plurality of scraping and stirring vanes 6, 6', 6'', working on the bottom surface 3 of the cooker by scraping. The scraping and stirring vanes 6, 6', 6'' are conveniently so dimensioned in length that each scraping and stirring vane, in each case, sweeps only a partial region of the bottom surface 3 of the cooker. With this a good match to the bottom is achieved and the thermal distortion is reduced. To hold and guide the scraping and stirring vanes 6, a plurality of supporting arms 8 are provided running horizontally with respect to the bottom surface 3 of the cooker, which supporting arms are preferably secured to the head of the drive member 5. The supporting arms 8 each have a carrying arm 9 directed towards the cooker bottom. For reasons of stability, the supporting arms 8 are held in a ring-shaped supporting frame 10 and firmly connected thereto, so that a wheel-like shape is formed. Secured to the carrying arms 9 are retaining strips 11, running parallel to the bottom surface 3 of the cooker, for the scraping and stirring vanes 6, 6′, 6″. The scraping and stirring vanes 6, 6′, 6″ are secured to the retaining strip 11 by means of rivets 13 with the interposition of an underlay strip 12.

The retaining strip 11 for the scraping and stirring vane 6″, rotating in the centre of the cooker 1 in the region of the drive member 5, is appropriately constructed in an L-shape. This L-shaped retaining strip 11 is, in this case, secured perpendicularly to the rotary member 5 by its shorter limbs 11″, whereas to the limb ends, remote from the rotary member 5, of the longer limbs 11′ of the L-shaped retaining strip 11 is arranged at right-angles thereto. The longer limb 11′ in this case serves as support for the scraping and stirring vanes 6″. The scraping and stirring vane 6″ is arranged on the retaining strip 11 in such a manner that the latter is connected with its one narrow side 18 directly adjacent to the shorter limb 11″ of the L-retaining strip 11 and extends with its longitudinal side 19 in the longitudinal direction of the longer limb 11′ of the L-retaining strip. The scraping and stirring vane 6″ is secured to the longer limb 11′ of the L-retaining strip 11, that is to say in such a manner that its scraping edge 20 lies along the centre line 21 of the bottom surface 3 of the cooker and of the drive member. The scraping and stirring vane 6″, held by the L-retaining strip 11, engages over the longer limb 11′ of the L-retaining strip.

By the L-shaped construction of the retaining strip 11 it is achieved that, in the region of the scraping and stirring vane 6″ and of the drive member 5, rotating at the centre of the cooker, no bulky material being cooked, such as bone splinters can block under the scraping and stirring vane 6″ and prevent its operation. The bores 14 in the scraping and stirring vanes for the insertion of the rivets 13 are appropriately larger than the associated bores 15 in the retaining strip 11. In this way it is achieved that the scraping and stirring vanes on the retaining strip 11 can expand unhindered on all sides on heating and in so doing can compensate for any stresses set up. The scraping and stirring vanes can, as can be seen from FIGS. 5 and 6, be provided with a bend 22 running in the longitudinal direction, which is appropriately arranged in the vicinity of the scraping region of the scraping and stirring vanes. This bend 22 serves to increase the elasticity of the scraping and stirring vanes and facilitates the matching of the scraping and stirring vanes to the appropriate conditions of the bottom surface 3 of the cooker.

The scraping and stirring vanes 6, 6′, 6″ of the scraping and stirring device 4, working individually on only one part-region of the bottom surface 3 of the cooker 1 each are arranged so distributed that their scraper paths overlap each other.

It will be understood that the above description of the present invention is susceptible to various modification changes and adaptations.

What is claimed is:

1. A scraping and stirring device for a cooking utensil comprising a driving member adapted to be arranged centrally in the bottom of said cooking utensil and extending into an upper region of said cooking utensil, horizontally extending supporting arms carried by said driving member at an upper part thereof and extending outwardly therefrom a distance which is at least half the radial extent of the device, carrying arms carried by and depending from said supporting arms and connected to said supporting arms towards outer ends of said supporting arms, scraping and stirring vanes carried by said carrying arms and having one edge in engagement with the bottom of said utensil and adapted in use to work only a part of the bottom of said cooking utensil, and retaining strips having an overall L-shape with horizontal limbs adapted to run parallel with the bottom of said cooking utensil for retaining said scraping and stirring vanes on said carrying arms.

2. A device as defined in claim 1, wherein said horizontal limbs comprise a shorter limb arranged at right angles to said drive member and a longer limb arranged at right angles to said shorter limb, and wherein there is further provided means for connecting a said scraping and stirring vane to said L-shaped member with a narrow side of said vane adjacent to said shorter limb and a longitudinal side of said vane running parallel to the direction of said longer limb.

3. A device as defined in claim 2, wherein said connecting means comprise means for connecting said scraping and stirring vane to said longer limb of said retaining strip.

4. A device as defined in claim 3, wherein said scraping and stirring vane comprises a portion which engages over said longer limb of said retaining member.

5. A device as defined in claim 1, and comprising means for connecting said scraping and stirring vanes to said retaining strip with the scraping edges of said scraping and stirring vanes each located on a different diametral line of said drive member and said cooking utensil.

* * * * *